(12) United States Patent
Daudin et al.

(10) Patent No.: US 8,552,235 B2
(45) Date of Patent: *Oct. 8, 2013

(54) PROCESS FOR HYDRODEOXYGENATION OF FEEDS DERIVED FROM RENEWABLE SOURCES WITH LIMITED DECARBOXYLATION CONVERSION USING A CATALYST BASED ON NICKEL AND MOLYBDENUM

(75) Inventors: Antoine Daudin, Corbas (FR); Laurent Bournay, Chaussan (FR); Thierry Chapus, Lyons (FR)

(73) Assignee: Merck Patent GmbH, Darmstadt (DE)

( * ) Notice: Subject to any disclaimer, the term of this patent is extended or adjusted under 35 U.S.C. 154(b) by 839 days.

This patent is subject to a terminal disclaimer.

(21) Appl. No.: 12/715,836

(22) Filed: Mar. 2, 2010

(65) Prior Publication Data

US 2010/0240942 A1    Sep. 23, 2010

(30) Foreign Application Priority Data

Mar. 10, 2009    (FR) .................................. 09 01081

(51) Int. Cl.
  *C07C 1/00*    (2006.01)
(52) U.S. Cl.
  USPC .............. 585/240; 585/242; 585/733; 44/605
(58) Field of Classification Search
  USPC ........................... 585/240, 242, 733; 44/605
  See application file for complete search history.

(56) References Cited

U.S. PATENT DOCUMENTS

| | | | | |
|---|---|---|---|---|
| 7,232,935 | B2 * | 6/2007 | Jakkula et al. | 585/240 |
| 7,288,685 | B2 * | 10/2007 | Marker | 585/240 |
| 8,026,401 | B2 * | 9/2011 | Abhari et al. | 585/240 |
| 8,119,847 | B2 * | 2/2012 | Dindi et al. | 585/240 |
| 2004/0132614 | A1 | 7/2004 | Harle et al. | |
| 2006/0264684 | A1 * | 11/2006 | Petri et al. | 585/250 |
| 2008/0244962 | A1 * | 10/2008 | Abhari et al. | 44/308 |
| 2008/0312480 | A1 * | 12/2008 | Dindi et al. | 585/240 |

FOREIGN PATENT DOCUMENTS

| | | |
|---|---|---|
| EP | 1 396 531 A2 | 3/2004 |
| FR | 2 843 050 A1 | 2/2004 |
| FR | 2 917 423 A1 | 12/2008 |
| WO | WO 2006/100584 A2 | 9/2006 |
| WO | WO 2007/141293 * | 12/2007 |
| WO | WO 2007/141293 A1 | 12/2007 |
| WO | WO 2008/058664 A1 | 5/2008 |

OTHER PUBLICATIONS

Study of the hydrodeoxygenation of carbonyl . . . NiMo/ gamma alumina catalyst, Etienne Laurent et al., applied Catalysis 109(1994) 97-115.*
Search Report of FR 0901081 (Nov. 23, 2009).
O. I. Senol et al., "Hydrodeoxygenation of Methyl Esters on Sulphided NiMo/y-Al$_2$O$_3$ and CoMo/y-Al$_2$O$_3$ Catalysts", Catalysis Today, vol. 100, No. 3-4 (2005) pp. 331-335.

* cited by examiner

*Primary Examiner* — Nina Bhat
(74) *Attorney, Agent, or Firm* — Millen, White, Zelano & Branigan, P.C.

(57) ABSTRACT

A process for hydrodeoxygenation of feeds derived from renewable sources with conversion by decarboxylation/decarbonylation limited to at most 10%, using a bulk or supported catalyst comprising an active phase constituted by at least one element from group VIB and at least one element from group VIII, said elements being in the sulphide form, and the atomic ratio of the metal (or metals) from group VIII to the metal (or metals) from group VIB being strictly more than 0 and less than 0.095, said process being carried out at a temperature in the range 120° C. to 450° C., at a pressure in the range 1 MPa to 10 MPa, at an hourly space velocity in the range 0.1 $h^{-1}$ to 10 $h^{-1}$, and in the presence of a total quantity of hydrogen mixed with the feed such that the hydrogen/feed ratio is in the range 50 to 3000 Nm$^3$ of hydrogen/m$^3$ of feed.

20 Claims, No Drawings

PROCESS FOR HYDRODEOXYGENATION OF FEEDS DERIVED FROM RENEWABLE SOURCES WITH LIMITED DECARBOXYLATION CONVERSION USING A CATALYST BASED ON NICKEL AND MOLYBDENUM

FIELD OF THE INVENTION

The international context of the years 2005-2010 is firstly marked by the rapid increase in the need for fuels, in particular gas oil bases, in the European community, and secondly by the magnitude of problems linked to global warming and the emission of greenhouse gases. This has led to an urge to reduce energy dependency as regards raw materials of fossil origin and a reduction in $CO_2$ emissions. In this context, the stakes are rising in the search for novel feeds derived from renewable sources which can readily be integrated into traditional plans for refining and the production of fuels.

To this end, integrating into the refining process novel products of vegetable origin derived from the conversion of lignocellulosic biomass or from the production of vegetable oils or animal fats has in the last few years enjoyed a surge of interest as a result of the increasing cost of fossil fuels. Similarly, traditional biofuels (primarily ethanol or methyl esters of vegetable oils) have acquired the status of a genuine complement to oilfield bases in fuel pools.

The high demand for gas oil fuels coupled with the significance of environmental considerations strengthens the interest in using feeds derived from renewable sources. Examples of such feeds which may be cited are vegetable oils (food or non-food) or oils derived from algae, animal fats or spent cooking oil, either raw or having undergone a prior treatment, as well as mixtures of such feeds. These feeds essentially contain chemical triglyceride type structures which the skilled person will also know as fatty acid triesters and fatty acids.

The very high molecular mass (more than 600 g/mol) of triglycerides and the high viscosity of the feeds under consideration means that using them directly or mixed with gas oils gives rise to difficulties for modern HDI type engines (compatibility with very high pressure injection pumps, problems with clogging of injectors, imperfect combustion, low yields, toxic unburned emissions). However, the hydrocarbon chains which constitute triglycerides are essentially linear and their length (number of carbon atoms) is compatible with the hydrocarbons present in the gas oils. Further, these chains generally contain in the range 0 to 3 unsaturated bonds, but that may be higher, in particular for oils derived from algae.

Thus, said feeds have to be transformed in order to obtain a good quality gas oil.

One possible approach consists of converting them by transesterification. The triglycerides, which essentially constitute such feeds, are then converted in the presence of an aliphatic monoalcohol into esters of fatty acids and into glycerin by a transesterification reaction. This reaction may be catalyzed by a homogeneous or heterogeneous phase catalyst. Disadvantages of that route which may be cited include: a) increased $NO_x$ emissions in the exhaust gas of internal combustion engines due to the presence of oxygen in the esters; b) the fairly high boiling point, of the order of 360° C., which may pose problems as regards satisfying gas oil end point specifications; c) obtaining a non-maximized cetane index (approximately 50 which is the minimum required for gas oil); and d) problems linked to stability to oxidation due to the presence of double bonds on the hydrocarbon chains.

A further possible route is the catalytic transformation of a vegetable oil into a deoxygenated paraffinic fuel in the presence of hydrogen (hydrotreatment). Many metallic or sulphide form catalysts are known to be active for that type of reaction.

Such vegetable oil hydrotreatment processes are already known and have been described in many patents. Examples which may be cited are: U.S. Pat. No. 4,992,605, U.S. Pat. No. 5,705,722, EP-1 681 337 and EP-1 741 768.

As an example, patent application EP-1 681 337 describes a process for transforming feeds derived from renewable sources by a deoxygenation reaction in order to produce middle distillates. The catalyst is constituted by a metallic active phase constituted by an element from group VIII dispersed on a metallic oxide or carbon type support. The catalysts used for the deoxygenation reaction are metallic catalysts, and so this route leads to the exclusive production of paraffins by decarboxylation/decarbonylation and results in the production of oxides of carbon. This has the advantage of a reduced hydrogen consumption compared with hydrodeoxygenation reactions, which consume hydrogen due to the production of water, but involves a reduction in the yield of upgradeable product (such as middle distillates, for example) due to the loss of one carbon atom per mole of hydrocarbons in the form of CO or $CO_2$.

Further, the oxides of carbon produced by the decarboxylation/decarbonylation reactions give rise to a methanation reaction which suffers from major disadvantages. Carbon monoxide and carbon dioxide are methanized as follows:

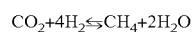

giving rise to:
1) an increased consumption of hydrogen;
2) the formation of water: the water/oxides of carbon mixture is well known to the skilled person to encourage carbonic corrosion which is deleterious to the materials of the process;
3) the need to purify recycled hydrogen in order to eliminate oxides of carbon using, for example, a supplemental and costly step for washing with amines and/or for methanation.

Sulphide catalysts are known to be active in hydrotreatment reactions: hydrodesulphurization, hydrodenitrogenation, hydrodeoxygenation and hydrodemetallization (B S Clausen, H T Topsøe and F E Massoth, from the work "Catalysis Science and Technology", 1996, volume 11, Springer-Verlag).

The many studies found in the literature bear witness to the potential for deoxygenation reactions carried out for the catalytic transformation of bio-liquid (derived from oils or from lignocellulose) into fuel. In particular, Senol et al (Applied Catalysis A: General vol 326, 2007, pp 236-244) studied the transformation of ester type model molecules representative of the hydrophilic function (ester group) and lipophilic function (alkyl chain) of triglycerides present in vegetable oils in the presence of CoMo or $NiMo/Al_2O_3$ sulphide catalysts.

In contrast to catalysts based on reduced metals, the use of solids based on transition metal sulphides allows the production of paraffins from ester type molecules in accordance with two reaction pathways:
  hydrodeoxygenation, resulting in the formation of water by consumption of hydrogen and the formation of hydrocarbons containing a number of carbon atoms (Cn) equal to that of the initial fatty acid chains;

decarboxylation/decarbonylation, resulting in the formation of oxides of carbon (carbon monoxide and carbon dioxide: CO and $CO_2$) and to the formation of hydrocarbons containing one fewer carbon atoms (Cn−1) than the initial fatty acid chains.

Patent application WO-2007/141293 describes a process for hydrodeoxygenation of a feed from a renewable source using a catalyst in the sulphide form comprising at least one metal from group VIB and at least one metal from group VIII wherein the atomic ratio of the metal (or metals) from group VIII to the metal (or metals) from group VIB is in the range 0.48 to 0.97. Thus, that process allows the production of paraffins using the two reaction pathways described above.

The starting feeds are feeds derived from renewable sources, such as oils and fats of vegetable or animal origin, or mixtures of such feeds, containing triglycerides and/or fatty acids. The vegetable oils used in the present invention may be unrefined or completely or partially refined, and derived from the following plants: rapeseed, sunflower seed, soya, African palm, palm nut, castor, olive, coprah, and jatropha oil; this list is not limiting. Fish or algae oils may also be used in the present invention. It is also possible to cite any animal fat such as lard or tallow, for example, or fats composed of residues from the food industry or from restaurants, such as spent cooking oil, for example. The feeds considered in the present invention mainly contain even numbered hydrocarbon compounds. Only animal fats comprise a maximum of 2.5% of odd numbered hydrocarbon compounds.

The feeds defined above contain triglycerides and/or fatty acid structures, the fatty chains of which contain a number of carbon atoms in the range 8 to 25 carbon atoms.

The hydrocarbons produced during conversion of the starting feeds in accordance with the invention are characterized by:

a) a number of carbon atoms equal to that of the starting fatty acid chains, if the mechanism is a mechanism for hydrodeoxygenation of the carboxyl group into an alkyl group, hydrodeoxygenation resulting in the formation of water by hydrogen consumption;

b) a hydrocarbon chain having one carbon atom fewer than the starting fatty acid chains if the mechanism occurring is decarboxylation/decarbonylation, this mechanism resulting in the formation of oxides of carbon (carbon monoxide and carbon dioxide: CO and $CO_2$);

c) a degree of branching of hydrocarbons adjusted so as to obtain cold properties and a cetane index which are compatible with current regulations for gas oil.

According to the prior art, as explained above, the two transformation pathways a) and b), hydrodeoxygenation and decarboxylation/decarbonylation, generally coexist in the presence of sulphide catalysts.

Thus, the aim of the present invention is to maximize the gas oil yield and to promote the hydrodeoxygenation mechanism described in a). The choice of catalyst and the operating conditions are thus aimed at orientating the selectivity to benefit hydrodeoxygenation while also aiming to limit hydrogen consumption to strictly that which is necessary, and in particular that which would result from unwanted reactions such as methanation.

The invention also aims to produce good quality gas oil fuel by isomerization of the paraffins of the gas oil cut, thereby limiting their cracking into unwanted lighter fractions such as a naphtha cut, for example.

It has thus been shown that it is possible to control the selectivity of hydrodeoxygenation reactions of feeds derived from renewable sources as a function of the nature of the active phase and more particularly as a function of the atomic ratio of the metal (or metals) from group VIII to the metal (or metals) from group VIB of said active phase.

Introducing nickel into a catalyst based on molybdenum sulphide in a process for hydrodeoxygenation of feeds derived from renewable sources has a general tendency to favour reactions known as decarboxylation/decarbonylation reactions even if the reaction for transformation of the vegetable oils by hydrodeoxygenation remains in the majority.

However, surprisingly, the Applicant has discovered that using an atomic ratio of metal (or metals) from group VIII to metal (or metals) from group VIB for said active phase and in particular to use a suitable Ni/Mo atomic ratio can control and enhance the selectivity for hydrodeoxygenation reactions and hence limit decarboxylation/decarbonylation reactions and thus limit the disadvantages caused by the formation of oxides of carbon.

Thus, the catalyst employed in the process of the invention comprises an active phase constituted by at least one element from group VIB and at least one element from group VIII, said elements being in the sulphide form and the atomic ratio of metal (or metals) from group VIII to metal (or metals) from group VIB being strictly more than 0 and less than 0.095.

AIM OF THE INVENTION

The present invention concerns a process for hydrodeoxygenation of feeds derived from renewable sources with conversion by decarboxylation/decarbonylation limited to at most 10%, using a bulk or supported catalyst comprising an active phase constituted by at least one element from group VIB and at least one element from group VIII, said elements being in the sulphide form, and the atomic ratio of the metal (or metals) from group VIII to the metal (or metals) from group VIB being strictly more than 0 and less than 0.095, said process being carried out at a temperature in the range 120° C. to 450° C., at a pressure in the range 1 MPa to 10 MPa, at an hourly space velocity in the range $0.1\ h^{-1}$ to $10\ h^{-1}$, and in the presence of a total quantity of hydrogen mixed with the feed such that the hydrogen/feed ratio is in the range 50 to 3000 $Nm^3$ of hydrogen/$m^3$ of feed.

Thus, the process of the invention can:
1) maximize the yield of fuel base;
2) limit carbonic corrosion;
3) facilitate the purification of recycle hydrogen;
4) limit methanation reactions causing increased consumption of hydrogen for reactions with no added value.

Furthermore, the present invention is particularly dedicated to the preparation of gas oil fuel bases which satisfy the latest environmental regulations, starting from feeds derived from renewable sources.

The gas oil bases produced in accordance with the invention are of excellent quality:
they have a low sulphur content, i.e. less than 10 ppm by weight;
and a low aromatics content, i.e. a total aromatics content of less than 5% by weight, and a polyaromatics content of less than 2% by weight;
they have an excellent cetane index of more than 55, preferably more than 60 and more preferably more than 70, due to the substantially paraffinic structure of the hydrocarbons formed;
they have good cold properties due to the degree of isomerization of the paraffins of the cut satisfying the fuel specifications, i.e. compatible with the standards in force: a filterability temperature limit of less than −15° C. and a cloud point of less than −5° C.;

the density obtained is low, generally less than 800 kg/m³, which is an advantage insofar as this helps the gas oil pool to satisfy the density specifications which is a maximum of 845 kg/m³ and thus means that higher density cuts can be incorporated.

DESCRIPTION OF THE INVENTION

The present invention concerns a process for hydrodeoxygenation of feeds derived from renewable sources with conversion by decarboxylation/decarbonylation limited to at most 10%, using a bulk or supported catalyst comprising an active phase constituted by at least one element from group VIB and at least one element from group VIII, said elements being in the sulphide form, and the atomic ratio of the metal (or metals) from group VIII to the metal (or metals) from group VIB being strictly more than 0 and less than 0.095, said process being carried out at a temperature in the range 120° C. to 450° C., at a pressure in the range 1 MPa to 10 MPa, at an hourly space velocity in the range $0.1 \text{ h}^{-1}$ to $10 \text{ h}^{-1}$, and in the presence of a total quantity of hydrogen mixed with the feed such that the hydrogen/feed ratio is in the range 50 to 3000 Nm³ of hydrogen/m³ of feed.

In accordance with the present invention, the term "active phase" means the phase containing the element or elements from the groups of metals in the sulphide form; in this case the active phase of the catalyst of the invention is constituted by at least one sulphide element from group VIB and at least one sulphide element from group VIII.

In accordance with the present invention, the catalyst used in the process of the invention may be supported, i.e. it comprises an amorphous mineral support selected from the group formed by alumina, silica, silica-aluminas, magnesia, clays and mixtures of at least two of these minerals. This support may also advantageously include other compounds, such as oxides selected from the group formed by boron oxide, zirconia, titanium oxide and phosphoric anhydride, for example.

Preferably, the amorphous mineral support is an alumina support (η, δ or γ).

In accordance with the present invention, said catalyst used in the process of the invention may alternatively be in the bulk form, i.e. without a support.

In accordance with the process of the invention, the active phase of said catalyst in the supported or bulk form is constituted by at least one element from group VIB and at least one element from group VIII, said element from group VIB being selected from molybdenum and tungsten; preferably, said element from group VIB is molybdenum; and said element from group VIII is selected from nickel and cobalt; preferably, said element from group VIII is nickel.

In accordance with the process of the invention, the atomic ratio of the metal (or metals) from group VIII to the metal (or metals) from group VIB is strictly more than 0 and less than 0.095, preferably in the range 0.01 to 0.08, more preferably in the range 0.01 to 0.05 and highly preferably in the range 0.01 to 0.03.

Preferably, the metal from group VIB is molybdenum and the metal from group VIII is nickel and the atomic ratio of the metal from group VIII to the metal from group VIB, i.e. the atomic ratio Ni/Mo, is strictly more than 0 and less than 0.095, preferably in the range 0.01 to 0.08, more preferably in the range 0.01 to 0.05 and highly preferably in the range 0.01 to 0.03.

In the case in which said catalyst is in the supported form, the quantity of the oxide of the element VIB is advantageously in the range 1% to 30% by weight with respect to the total catalyst mass, preferably in the range 10% to 25% by weight, more preferably in the range 15% to 25% by weight and still more preferably in the range 17% to 23% by weight, and the quantity of the oxide of the element from group VIII is advantageously strictly more than 0% and less than 1.5% by weight with respect to the total catalyst mass, preferably in the range 0.05% to 1.1% by weight, more preferably in the range 0.07% to 0.65% by weight and still more preferably in the range 0.08% to 0.36% by weight.

In the context of the invention, the minimum value of the atomic ratio Ni/Mo of 0.01 for a molybdenum oxide content of 1% by weight, corresponds to a nickel content of 50 ppm by weight, detectable by the usual techniques of elemental analysis by ICP (inductively coupled plasma), said nickel detection limit being of the order of ppm.

In the case in which said catalyst is in the bulk form, the quantity of the oxide of elements from group VIB and VIII are defined by the atomic ratios of the metal (or metals) from group VIII to the metal (or metals) from group VIB as defined in accordance with the invention.

For an atomic ratio of the metal (or metals) from group VIII to the metal (or metals) from group VIB of strictly more than 0 and less than 0.095, the quantity of element from group VIB is advantageously more than 95.3% and strictly less than 100% by weight as the oxide equivalent of the element from group VIB and the quantity of the element from group VIII is advantageously strictly more than 0 and less than 4.7% by weight as the oxide equivalent of the element from group VIII.

For an atomic ratio of the metal (or metals) from group VIII to the metal (or metals) from group VIB in the range 0.01 to 0.08, the quantity of element from group VIB is advantageously in the range 96% to 99.4% by weight as the oxide equivalent of the element from group VIB and the quantity of the element from group VIII is advantageously in the range 0.6% to 4% by weight as the oxide equivalent of the element from group VIII.

For an atomic ratio of the metal (or metals) from group VIII to the metal (or metals) from group VIB in the range 0.01 to 0.05, the quantity of element from group VIB is advantageously in the range 97.4% to 99.4% by weight as the oxide equivalent of the element from group VIB and the quantity of the element from group VIII is advantageously in the range 0.6% to 2.6% by weight as the oxide equivalent of the element from group VIII.

For an atomic ratio of the metal (or metals) from group VIII to the metal (or metals) from group VIB in the range 0.01 to 0.03, the quantity of element from group VIB is advantageously in the range 98.4% to 99.4% by weight as the oxide equivalent of the element from group VIB and the quantity of the element from group VIII is advantageously in the range 0.6% to 1.6% by weight as the oxide equivalent of the element from group VIII.

The catalyst of the invention may also advantageously contain at least one doping element in order to produce a high level of conversion while maintaining a reaction selectivity for the hydrodeoxygenation pathway. The active phase in the case in which said catalyst is in the bulk form and/or the support in the case in which said catalyst is in the supported form may thus also advantageously contain at least one doping element selected from phosphorus, fluorine and boron; preferably, the doping element is phosphorus. The skilled person will be aware that these elements have indirect effects on catalytic activity: better dispersion of the sulphurized active phase and an increase in the acidity of the catalyst which favours the hydrotreatment reactions (Sun et al, Catalysis Today 86(2003), 173).

Said doping element may be introduced into the matrix or be deposited on the support. Advantageously, it is also possible to deposit silicon onto the support, alone or with phosphorus and/or boron and/or fluorine.

The quantity of doping element, preferably phosphorus, is advantageously strictly more than 1% and less than 8% by weight of the oxide $P_2O_5$ with respect to the total catalyst mass, preferably more than 1.5% and less than 8%, and more preferably more than 3% and less than 8% by weight.

The use of the catalyst described above in the process of the invention means that the formation of oxides of carbon can be limited for the reasons given above, by limiting decarboxylation/decarbonylation reactions.

In the context of the invention, it is thus possible to maintain a total conversion of the feed derived from a renewable source which is advantageously 90% or higher, preferably more than 95% and more preferably more than 98%, while maximizing the yield of hydrodeoxygenation product, i.e. of deoxygenated products which advantageously remains 90% or higher, preferably 95% or higher and more preferably 96% or higher.

In accordance with the invention, conversion of the feed by decarboxylation/decarbonylation is limited to at most 10%, preferably limited to at most 5% and more preferably limited to at most 4%.

The hydrodeoxygenation reaction results in the formation of water by consumption of hydrogen and to the formation of hydrocarbons with a number of carbon atoms equal to that of the initial fatty acid chains. The feeds considered in the present invention mainly contain even-numbered hydrocarbon compounds. This is a characteristic which is well known in vegetable oils, oils derived from algae and fish oils which are principally composed of triglycerides the hydrocarbon chains of which contain an even number of carbon atoms, generally from 8 to 24. Certain fats of animal origin may have hydrocarbon chains containing 17 carbon atoms amounting to a few percent (generally 2% to 3% by weight) (reference: Biodiesel, the comprehensive handbook, by Martin Mittelbach and Claudia Remschmidt). The effluent derived from the hydrodeoxygenation process of the invention thus comprises hydrocarbon compounds with a number of carbon atoms (Cn) (n being an even number) which is equal to that of the initial fatty acid chains, which is in the vast majority compared with hydrocarbon compounds comprising one fewer carbon atoms (Cn−1) (n−1 being odd, by definition) compared with the initial fatty acid chains, which are obtained by decarbonylation/decarboxylation reactions. The selectivity for the hydrodeoxygenation pathway is demonstrated by measuring the total yield of hydrocarbon compounds with a number of carbon atoms (Cn) equal to that of the initial fatty acid chains and the total yield of hydrocarbon compounds comprising one fewer carbon atoms (Cn−1) compared with the initial fatty acid chains in the upgradeable fuel fraction. The yields of hydrocarbons (Cn) containing an even number of carbon atoms and (Cn−1) containing an odd number of carbon atoms providing access to the selectivity of the reaction for the hydrodeoxygenation reaction are obtained by gas chromatographic analysis of the liquid effluents from the reaction which can be upgraded to fuel. The technique for measurement by gas chromatographic analysis is a method which is known to the skilled person.

It has thus been shown that it is possible to control the selectivity of hydrodeoxygenation reactions of feeds derived from renewable sources and to minimize the decarboxylation/decarbonylation reactions as a function of the nature of the active phase and more particularly as a function of the atomic ratio of the metal (or metals) from group VIII to the metal (or metals) from group VIB of said active phase.

Surprisingly, the use of a catalyst having an atomic ratio of metal (or metals) from group VIII to metal (or metals) from group VIB of said active phase and in particular the use of a Ni/Mo atomic ratio strictly more than 0 and less than 0.095 means that the selectivity for hydrodeoxygenation reactions can be controlled and enhanced; thus, the decarboxylation/decarbonylation reactions can be limited and thus the problems caused by the formation of oxides of carbon are limited.

Further, the increase in the quantity of the element from group VIII and in particular nickel tends to favour the decarboxylation/decarbonylation reaction even though the hydrodeoxygenation remains the major reaction. Thus, it has been demonstrated that the hydrodeoxygenation selectivity is optimized, in particular for values of the atomic ratio Ni/Mo in the range 0.01 to 0.03.

In the case in which a supported catalyst in accordance with the invention is used, the hydrogenating function may be introduced onto said catalyst using any method which is known to the skilled person, such as by co-mixing or dry impregnation; sulphurization is then carried out in situ or ex situ using a method which is known to the skilled person.

In the case in which a bulk catalyst in accordance with the invention is used, said catalyst is prepared using methods which are known to the skilled person, such as the decomposition of metallic thiosalts, for example.

In accordance with the hydrodeoxygenation process of the invention, the feed, which may have been pre-treated, is brought into contact with a catalyst of the invention at a temperature in the range 120° C. to 450° C., preferably in the range 120° C. to 350° C., preferably in the range 150° C. to 320° C., and more preferably in the range 180° C. to 310° C. The pressure is in the range 1 MPa to 10 MPa, preferably in the range 1 MPa to 6 MPa. The hourly space velocity is in the range $0.1\ h^{-1}$ to $10\ h^{-1}$. The feed is brought into contact with said catalyst in the presence of hydrogen. The total quantity of hydrogen mixed with the feed is such that the hydrogen/feed ratio is in the range 50 to 3000 $Nm^3$ hydrogen/$m^3$ of feed, preferably in the range 70 to 2000 $Nm^3$ hydrogen/$m^3$ of feed and more preferably in the range 150 to 1500 $Nm^3$ hydrogen/$m^3$ of feed.

The hydrodeoxygenation process of the invention is advantageously carried out in fixed bed or ebullated bed mode, preferably in fixed bed mode.

In the case in which the hydrodeoxygenation process is carried out in fixed bed mode, said process is operated at a temperature in the range 120° C. to 450° C., preferably in the range 120° C. to 350° C., more preferably in the range 150° C. to 320° C., and still more preferably in the range 180° C. to 310° C. The pressure is in the range 1 MPa to 10 MPa, preferably in the range 1 MPa to 6 MPa. The hourly space velocity is in the range $0.1\ h^{-1}$ to $10\ h^{-1}$. The feed is brought into contact with said catalyst in the presence of hydrogen. The total quantity of hydrogen mixed with the feed is such that the hydrogen/feed ratio is in the range 50 to 3000 $Nm^3$ hydrogen/$m^3$ of feed, preferably in the range 70 to 2000 $Nm^3$ hydrogen/$m^3$ of feed and more preferably in the range 150 to 1500 $Nm^3$ hydrogen/$m^3$ of feed.

In the case in which the hydrodeoxygenation process is carried out in ebullated bed mode, said process is operated at an absolute pressure of 2 to 35 MPa, preferably 2 to 15 MPa and more preferably in the range 3 to 10 MPa, at a temperature in the range 200° C. to 450° C., preferably in the range 250° C. to 380° C., at a HSV in the range $0.1\ h^{-1}$ to $10\ h^{-1}$, preferably in the range $0.5\ h^{-1}$ to $5\ h^{-1}$ and with a quantity of hydrogen mixed with the feed in the range 50 to 5000 normal cubic meters ($Nm^3$) per cubic meter ($m^3$) of liquid feed, preferably in the range 100 to 1000 $Nm^3$ hydrogen/$m^3$ of feed and more preferably in the range 200 to 500 $Nm^3$ hydrogen/$m^3$ of feed.

The context of the present invention also encompasses using, in the hydrodeoxygenation process of the invention, a single catalyst or several different catalysts in accordance with the invention, simultaneously or successively. Said process may advantageously be carried out industrially in one or more reactors with one or more catalytic beds, preferably in mixed gas and liquid downflow mode. The skilled person usually describes this type of reactor as a trickle bed reactor.

It is well known to the skilled person that the reactions which occur are highly exothermic. This means that they are accompanied by the release of a large amount of heat. This results in the temperature of the reaction medium increasing substantially, which could result in unwanted effects. Further, the temperature has the effect of increasing the reaction rate, which will then release more heat. This type of self-sustained phenomenon must be controlled so that it does not run away and produce very high temperatures which may be above the melting points of the materials of the reactor. Before this extreme is reached, high temperatures encourage cracking reactions forming light hydrocarbons (methane, ethane) which are difficult to upgrade; it also reduces the quantity of paraffins produced. In general, it is clearly vital to control the increase in temperature linked to carrying out the exothermic reactions of the invention, both for safety reasons and for the sake of the overall yield of the process.

Various techniques which are well known to the skilled person have been envisaged for this purpose, notably the method described in patent WO-2008/058664.

Advantageously, the feed may be pre-treated or pre-refined in advance in order to eliminate, by an appropriate treatment, contaminants which are naturally present in bio-liquids of renewable origin such as alkali metals, alkaline-earth metals and transition metals, as well as nitrogen. Examples of appropriate treatments are thermal and/or chemical treatments which are well known to the person skilled in the refining art.

Preferably, the optional pre-treatment consists of mild pre-hydrogenation of said feed in order to hydrogenate the reactive unsaturated bonds. Advantageously, mild pre-hydrogenation is operated at a temperature in the range 50° C. to 400° C. and at a hydrogen pressure in the range 0.1 to 10 MPa; preferably, at a temperature in the range 150° C. to 200° C. The pre-hydrogenation catalyst advantageously comprises metals from group VIII and/or VIB; preferably, the pre-hydrogenation catalyst is a catalyst based on palladium, platinum, nickel and molybdenum or based on cobalt and molybdenum, dispersed on a metallic oxide or a mixture of oxides such as aluminas, silicas, titanium and zeolite.

The metals of the catalysts used in the optional pre-treatment step of the process of the invention are sulphurized metals or metallic phases, preferably metallic phases.

For the purposes of producing a gas oil fuel having improved properties, the hydrocarbon effluent is then treated in the following optional steps:

The effluent from the hydrodeoxygenation process of the invention then undergoes at least one separation step, preferably a step for gas/liquid separation and for separating water and at least one liquid hydrocarbon base, said steps being optional and which may be carried out in any order with respect to each other.

Preferably, the effluent from the hydrodeoxygenation process of the invention initially undergoes a gas/liquid separation step. The aim of this step is to separate gas from liquid, and in particular to recover hydrogen-rich gas which may also contain gas such as CO, $CO_2$, $H_2S$ and propane and at least one liquid effluent, said gas advantageously also being purified using methods which are known to the skilled person, such as methanation for the transformation of CO to $CH_4$ and amine washing to eliminate $CO_2$.

Preferably, the liquid effluent from the preceding optional gas/liquid separation then undergoes separation of at least a portion and preferably all of the water formed, at least one liquid hydrocarbon base, the water being produced during the hydrodeoxygenation reactions.

The aim of this step is to separate water from the liquid hydrocarbon effluent. The term "elimination of water" means elimination of the water produced by the hydrodeoxygenation (HDO) reactions. The more or less complete elimination of water is advantageously a function of the water tolerance of the hydroisomerization catalyst used in the subsequent optional step of the process of the invention. Water may be eliminated using any method and technique known to the skilled person, such as by drying, passage over a dessicant, flash, solvent extraction, distillation and decanting or by combining at least two of these methods.

Optionally, a final step for purification of the various pollutants may be carried out using methods which are known to the skilled person, such as steam stripping or nitrogen stripping or by coalescence and/or a capture mass. A step for eliminating nitrogen-containing compounds from said hydrocarbon base which is obtained may advantageously be carried out between the hydrodeoxygenation step of the invention and an optional hydroisomerization step.

Preferably, a step for eliminating the nitrogen-containing compounds is carried out after said optional water separation step and preferably after said final purification step.

The hydrocarbon base derived from the optional preceding step for separating water or preferably from said final purification step generally contains residual organic nitrogen-containing compounds which have not been eliminated during the hydrodeoxygenation reactions of the process of the invention. Said residual nitrogen-containing organic compounds are inhibitors of the hydroisomerization catalysts. Thus, they have to be eliminated from said hydrocarbon base before passing on to an optional hydroisomerization step. The residual nitrogen-containing organic compounds may be eliminated using any of the techniques which are known to the skilled person, such as the use of capture masses. The term "capture mass" means activated or non-activated aluminas, silica-aluminas, zeolites, activated charcoal and ion exchange resins. Preferably, the step for elimination of the nitrogen-containing organic compounds is carried out on ion exchange resins.

In accordance with a preferred implementation, at least a portion of the liquid hydrocarbon base obtained from the preceding step for elimination of the nitrogen-containing organic compounds is hydroisomerized in the presence of a selective hydroisomerization catalyst. The hydroisomerization catalysts used are advantageously of the bifunctional type, i.e. they have a hydrodehydrogenating function and a hydroisomerization function.

Said hydroisomerization catalyst advantageously comprises at least one metal from group VIII and/or at least one metal from group VIB as a hydrodehydrogenating function and at least one molecular sieve or an amorphous mineral support as the hydroisomerization function.

Said hydroisomerization catalyst advantageously comprises either at least one noble metal from group VIII, preferably selected from platinum and palladium, which are active in their reduced form, or at least one metal from group VIB, preferably selected from molybdenum and tungsten, in combination with at least one non-noble metal from group VIII, preferably selected from nickel and cobalt, preferably used in their sulphurized form.

In the case in which the hydroisomerization catalyst comprises at least one noble metal from group VIII, the total quantity of noble metal in the hydroisomerization catalyst is advantageously in the range 0.01% to 5% by weight with respect to the finished catalyst, preferably in the range 0.1% to 4% by weight and more preferably in the range 0.2% to 2% by weight.

Preferably, the hydroisomerization catalyst comprises platinum or palladium; preferably, the hydroisomerization catalyst comprises platinum.

In the case in which the hydroisomerization catalyst comprises at least one metal from group VIB in combination with at least one non-noble metal from group VIII, the quantity of metal from group VIB in the hydroisomerization catalyst is advantageously in the range, as the oxide equivalent, 5% to 40% by weight with respect to the finished catalyst, preferably in the range 10% to 35% by weight and highly preferably in the range 15% to 30% by weight, and the quantity of metal from group VIII of said catalyst is advantageously in the range, as the oxide equivalent, 0.5% to 10% by weight with respect to the finished catalyst, preferably in the range 1% to 8% by weight and more preferably in the range 1.5% to 6% by weight.

The hydrodehydrogenating metallic function may advantageously be introduced onto said catalyst using any method which is known to the skilled person, such as co-mixing, dry impregnation, or impregnation by exchange.

In accordance with a preferred implementation, said hydroisomerization catalyst comprises at least one amorphous mineral support as the hydroisomerization function, said amorphous mineral support being selected from silica-aluminas and siliceous aluminas, preferably silica-aluminas.

In accordance with another preferred implement, said hydroisomerization catalyst comprises at least one molecular sieve, preferably at least one zeolitic molecular sieve; more preferably, at least one unidimensional 10MR zeolitic molecular sieve as the hydroisomerization function.

Zeolitic molecular sieves are defined in the "Atlas of Zeolite Structure Types" by W M Meier, D H Olson and Ch Baerlocher, 5$^{th}$ revised edition, 2001, Elsevier; the present application also refers thereto. Zeolites are classified therein by the size of their pore or channel openings.

Unidimensional 10MR zeolitic molecular sieves have pores or channels with an opening defined by a ring of 10 oxygen atoms (10MR opening). The channels of a zeolitic molecular sieve with a 10MR opening are advantageously unidimensional non-interconnected channels which open directly to the outside of said zeolite. The unidimensional 10MR zeolitic molecular sieves present in said hydroisomerization catalyst advantageously comprise silicon and at least one element T selected from the group formed by aluminium, iron, gallium, phosphorus and boron, preferably aluminium. The Si/Al ratios of the zeolites described above are advantageously those obtained on synthesis or obtained after post-synthesis dealumination treatments which are well known to the skilled person; non-exhaustive examples are hydrothermal treatments which may or may not be followed by acid attacks, or direct acid attacks with mineral or organic acid solutions. They are preferably practically completely in the acid form, i.e. the atomic ratio between the monovalent compensation catalyst (for example sodium) and the element T inserted into the crystalline network of the solid is advantageously less than 0.1, preferably less than 0.05 and more preferably less than 0.01. Thus, the zeolites forming part of the composition of said selective hydroisomerization catalyst are advantageously calcined and exchanged with at least one treatment with a solution of at least one ammonium salt in order to obtain the ammonium form of the zeolites which, once calcined, result in the acid form of said zeolites.

Said unidimensional 10MR zeolitic molecular sieve of said hydroisomerization catalyst is advantageously selected from zeolitic molecular sieves with structure type TON, such as NU-10, PER such as ferrierite, EUO selected from EU-1 and ZSM-50, taken alone or as a mixture, or the zeolitic molecular sieves ZSM-48, ZBM-30, IZM-1, COK-7, EU-2 and EU-11, taken alone or as a mixture. Preferably, said unidimensional 10MR zeolitic molecular sieve is selected from the zeolitic molecular sieves ZSM-48, ZBM-30, IZM-1 and COK-7, taken alone or as a mixture. More preferably, said unidimensional 10MR zeolitic molecular sieve is selected from the zeolitic molecular sieves ZSM-48 and ZBM-30, taken alone or as a mixture.

Highly preferably, said unidimensional 10MR zeolitic molecular sieve is ZBM-30 and still more preferably, said unidimensional 10MR zeolitic molecular sieve is ZBM-30 synthesized with the organic template triethylenetetramine.

Preferably, the hydroisomerization catalyst comprises an active metallic phase constituted by platinum and a hydroisomerization function based on ZBM-30; preferably, the hydroisomerization catalyst comprises a metallic active phase constituted by platinum and a hydroisomerization function based on ZBM-30 synthesized with the organic template triethylenetetramine.

ZBM-30 is described in patent EP-0 046 504 and the zeolite COK-7 is described in patent applications EP-1 702 888 A1 or FR-2 882 744 A1.

IZM-1 zeolite is described in patent application FR-A-2 911 866.

Zeolites with structure type TON are described in the work entitled "Atlas of Zeolite Structure Types" by W Meier, D H Olson and Ch Baerlocher, 5$^{th}$ revised edition, 2001, Elsevier.

Zeolite with structure type TON is described in the work "Atlas of Zeolite Structure Types" cited above; NU-10 zeolite is described in patents EP-A-0 065 400 and EP-A-0 077 624.

Zeolite with structure type FER is described in the work "Atlas of Zeolite Structure Types" cited above.

The quantity of unidimensional 10MR zeolitic molecular sieve is advantageously in the range 5% to 95% by weight, preferably in the range 10% to 90% by weight, more preferably in the range 15% to 85% by weight and highly preferably in the range 20% to 80% by weight with respect to the finished catalyst.

Preferably, said hydroisomerization catalyst also comprises a binder constituted by a porous mineral matrix. Said binder may advantageously be used during the step for shaping said hydroisomerization catalyst.

Preferably, shaping is carried out with a binder constituted by a matrix containing alumina in any of its forms which are known to the skilled person; highly preferably, with a matrix containing gamma alumina.

The hydroisomerization catalysts obtained are advantageously shaped into the form of grains with various shapes and dimensions. They are generally used in the form of cylindrical or polylobed extrudates such as bilobes, trilobes, polylobes with a straight or twisted shape, but they may optionally be manufactured and used in the form of crushed powders, tablets, rings, beads or wheels. Techniques other than extrusion, such as pelletization or bowl granulation, may advantageously be employed.

In the case in which the hydroisomerization catalyst contains at least one noble metal, the noble metal contained in said hydroisomerization catalyst should advantageously be reduced. A preferred method for reducing the metal is treatment in hydrogen at a temperature in the range 150° C. to 650° C. and a total pressure in the range 1 to 250 bar. As an example, reduction consists of a constant temperature stage at 150° C. for two hours then a temperature ramp-up to 450° C. at a rate of 1° C./min followed by a constant temperature stage of two hours at 450° C.; during the whole of this reduction step, the hydrogen flow rate is 1000 normal m³ of hydrogen/m³ of catalyst and the total pressure is held constant at 1 bar. Any ex situ reduction method may advantageously be envisaged.

In the hydroisomerization step, the feed is advantageously brought into contact in the presence of hydrogen with said hydroisomerization catalyst at temperatures and at operating pressures which mean that hydroisomerization of the non converting feed can advantageously be carried out. This means that hydroisomerization is carried out with a conversion of the 150° C.⁺ fraction into a 150° C.⁻ fraction of less than 20% by weight, preferably less than 10% by weight and more preferably less than 5% by weight.

Thus, the optional hydroisomerization step of the process of the invention is advantageously operated at a temperature in the range 150° C. to 500° C., preferably in the range 150° C. to 450° C., highly preferably in the range 200° C. to 450° C., at a pressure in the range 1 MPa to 10 MPa, preferably in the range 1 MPa to 10 MPa and highly preferably in the range 2 MPa to 9 MPa, at an hourly space velocity which is advantageously in the range $0.1\ h^{-1}$ to $10\ h^{-1}$, preferably in the range 0.2 to $7\ h^{-1}$ and highly preferably in the range 0.5 to 5 $h^{-1}$, at a hydrogen flow rate such that the hydrogen/hydrocarbon volume ratio is advantageously in the range 70 to 1000 Nm³/m³ of feed, in the range 100 to 1000 normal m³ of hydrogen per m³ of feed and preferably in the range 150 to 1000 normal m³ of hydrogen per m³ of feed.

Preferably, the optional hydroisomerization step operates in co-current mode.

At least a portion, preferably all, of the hydroisomerized effluent then advantageously undergoes one or more separation steps. The aim of this step is to separate gas from liquid, and in particular to recover hydrogen-rich gas which may also contain light gases such as the $C_1$-$C_4$ cut and at least one gas oil and a naphtha cut. Upgrading the naphtha cut is not an aim of the present invention, but this cut may advantageously be sent to a steam cracking unit or the catalytic reforming unit.

Gas Treatment and Recycling

If necessary, at least a portion of the gas containing hydrogen which was separated during the optional separation step deriving from the hydrodeoxygenation process of the invention and/or from the optional hydroisomerization step is advantageously, if necessary, treated to reduce its light compound content ($C_1$ to $C_4$).

The possibility exists of adding to the recycle gas deriving from the preceding optional separation step a certain quantity of sulphur containing compounds such as DMDS (dimethyldisulphide) which produces hydrogen sulphide $H_2S$ on thermal decomposition. This device can if necessary maintain the hydroisomerization catalyst and/or the hydroisomerization catalyst in the sulphurized state. Advantageously, the quantity of sulphur containing compound introduced is such that the quantity of $H_2S$ in the recycle gas is at least 15 ppm by volume, preferably at least 0.1% by volume, or even at least 0.2% by volume.

Advantageously, recycle hydrogen may be introduced either with the feed entering the hydrodeoxygenation process of the invention and/or the optional hydroisomerization step, or in the form of quenching hydrogen between the hydrodeoxygenation catalysts of the invention and/or the hydroisomerization catalysts.

Products Obtained

The product supplied using the process of the invention is endowed with excellent characteristics which forms an excellent quality gas oil base:
its sulphur content is less than 10 ppm by weight;
its total aromatics content is less than 5% by weight, and the polyaromatics content is less than 2% by weight;
its cetane index is excellent, at more than 55;
its density is less than 840 kg/m³, usually less than 820 kg/m³;
its cold properties are compatible with regulations in force: a cold filter plugging point of less than −15° C. and a cloud point of less than −5° C.

The following example sets out the invention without limiting its scope.

Example

Hydrodeoxygenation: Comparison of Performances of NiMoP/Al₂O₃ Catalysts with Different Ni/Mo Ratios 50 mL/h of pre-refined rapeseed oil with a density of 920 kg/m³ and a sulphur content of less than 10 ppm by weight, with a cetane index of 35 was introduced into an isothermal fixed bed reactor charged with 100 mL of hydrotreatment catalyst. 700 Nm³ of hydrogen/m³ of feed was introduced into the reactor maintained at a temperature of 300° C. and at a pressure of 5 MPa.

The principal characteristics of the rapeseed oil feed used in the process of the invention are shown in Table 1.

The feed constituted by rapeseed oil contained triglycerides the hydrocarbon chains of which principally contained an even number of carbon atoms. The chains containing an odd number of carbon atoms in the initial feed (exclusively C17 for this oil) and the contribution of the transformation products of hydrocarbons containing an odd number of carbon atoms, C17:0 and C17:1 by the two reaction pathways, hydrodeoxygenation and decarboxylation/decarbonylation, were very minor and were ignored for the calculations of the yields of even and odd hydrocarbons,

TABLE 1

| Properties of the feed | Values |
|---|---|
| Elemental analysis | |
| S [ppm by wt] | 4 |
| N [ppm by wt] | 23 |
| P [ppm by wt] | 177 |
| C [wt %] | 77.2 |
| H [wt %] | 11.6 |
| O [wt %] | 11.2 |
| Fatty acid composition (%) | |
| 14:0 | 0.1 |
| 16:0 | 5.0 |
| 16:1 | 0.3 |
| 17:0 | 0.1 |
| 17:1 | 0.1 |
| 18:0 | 1.5 |
| 18:1 trans | <0.1 |
| 18:1 cis | 60.1 |
| 18:2 trans | <0.1 |
| 18:2 cis | 20.4 |
| 18:3 trans | <0.1 |
| 18:3 cis | 9.6 |
| 20:0 | 0.5 |
| 20:1 | 1.2 |

TABLE 1-continued

| Properties of the feed | Values |
|---|---|
| 22:0 | 0.3 |
| 22:1 | 0.2 |
| 24:0 | 0.1 |
| 24:1 | 0.2 |

The catalyst NiMoP1 in accordance with the invention and used in the process of the invention comprised 0.22% by weight of NiO, 21% by weight of $MoO_3$ and 5% by weight of $P_2O_5$ supported on a gamma alumina. The catalyst NiMoP1 had an atomic ratio Ni/Mo equal to 0.02. The NiMoP2 catalyst of the invention used in the process of the invention comprised 0.54% by weight of NiO, 21% by weight of $MoO_3$ and 5% by weight of $P_2O_5$ supported on a gamma alumina. The catalyst NiMoP2 had an atomic ratio Ni/Mo equal to 0.05. The catalyst NiMoP3, not in accordance with the invention and used for comparison in the process of the invention, comprised 21% by weight of $MoO_3$, 5% by weight of $P_2O_5$ and 4.35% by weight of NiO dispersed on the same type of alumina support. The catalyst NiMoP3 had an atomic ratio Ni/Mo equal to 0.4.

In the three cases, the Mo/P weight ratio was kept constant.

The supported catalysts were prepared by dry impregnation of oxide precursors in solution then in situ sulphurization at a temperature of 350° C. prior to the test using a straight run gas oil feed supplemented with 2% by weight of dimethyldisulphide (DMDS). After in situ sulphurization in the unit under pressure, the feed derived from a renewable source constituted by rapeseed oil described in Table 1 was sent to the reactor.

In order to maintain the catalyst in the sulphurized state, 50 ppm by weight of sulphur was added to the feed in the form of DMDS. Under the reaction conditions, the DMDS was completely decomposed to form methane and $H_2S$.

The method for preparing the catalysts does not limit the scope of the invention.

The results obtained for the catalysts NiMoP1, NiMoP2, in accordance with the invention, and NiMoP3, not in accordance with the invention, are shown in Table 2.

TABLE 2

|  | NiMoP1 | NiMoP2 | NiMoP3 |
|---|---|---|---|
| Ni/Mo atomic ratio | 0.02 | 0.05 | 0.4 |
| Operating conditions: |  |  |  |
| Temperature [° C.] | 300 | 300 | 300 |
| Pressure [MPa] | 5 | 5 | 5 |
| $H_2$/feed [$Nm^3/m^3$] | 700 | 700 | 700 |
| Sulphur content [ppm by wt] | 50 | 50 | 50 |
| Results: |  |  |  |
| Total conversion of feed [wt %] | 100 | 100 | 100 |
| Deoxygenated product yield [wt %] | 100 | 100 | 100 |
| HDO** selectivity [even HC*, wt %] | 96.8 | 92.8 | 82 |
| Decarb selectivity** [odd HC*, wt %] | 3.2 | 7.2 | 18 |
| Even HC/odd HC [wt %/wt %] | 30 | 13 | 4.6 |

*yields of even HC = $C_{14}$-$C_{24}$ hydrocarbons; yields of odd HC = $C_{15}$-$C_{23}$ hydrocarbons;
**Selectivity with respect to paraffinic effluents produced.

We see that under the same reaction conditions and for total conversion of rapeseed oil, the use of catalysts NiMoP1 and NiMoP2 in accordance with the invention thus resulted in the highly selective formation of more than 90% by weight of ($C_{14}$ to $C_{24}$) hydrocarbons containing an even number of carbon atoms and less than 10% by weight of ($C_{15}$-$C_{23}$) hydrocarbons containing an odd number of carbon atoms.

Thus, the NiMoP1 and NiMoP2 catalysts of the invention, i.e. with a Ni/Mo atomic ratio strictly more than 0 and less than 0.095, not only allows total deoxygenation (deoxygenation product yield=100%), but also allows the reaction selectivity to be kept high for the hydrodeoxygenation reactions (a selectivity, i.e. a conversion of the feed by hydrodeoxygenation, of 96.8% and 92.8% for NiMoP1 and NiMoP2 respectively) and thus limits the conversion of the feed by decarboxylation/decarbonylation, i.e. a reaction selectivity for decarboxylation/decarbonylation reactions of 3.2% and 7.2% respectively for NiMoP1 and NiMoP2.

This thus involves on the one hand the greater production of paraffins containing a higher number of carbon atoms and on the other hand a substantial limitation on the formation of oxides of carbon (CO and $CO_2$).

The yields by weight were obtained by gas chromatographic analysis of the liquid reaction effluents that can be upgraded as fuel in a manner which is known to the skilled person.

Separation of Effluent from the Hydrodeoxygenation Step

All of the hydrotreated effluent from the hydrodeoxygenation process of the invention was separated in order to recover hydrogen-rich gas and a liquid gas oil base.

Hydroisomerization of Hydrodeoxygenated Effluent Derived from Separation Step Over a Hydroisomerization Catalyst The hydroisomerization catalyst was a catalyst containing a noble metal and a unidimensional 10MR ZBM-30 zeolite. This catalyst was obtained using the operating procedure described below. The ZBM-30 zeolite was synthesized in accordance with BASF's patent EP-A-0 046 504 with the organic template triethylenetetramine. The as-synthesized ZBM-30 zeolite underwent calcining at 550° C. in a stream of dry air for 12 hours. The H-ZBM-30 zeolite (acid form) obtained had a Si/Al ratio of 45. The zeolite was mixed with a SB3 type alumina gel supplied by Condéa-Sasol. The mixed paste was then extruded through a 1.4 mm diameter die. The extrudates obtained were calcined at 500° C. for 2 hours in air. The H-ZBM-30 weight content was 20% by weight. Next, the support extrudates underwent a dry impregnation step using an aqueous solution of the platinum salt $Pt(NH_3)_4^{2+}$, $2OH^-$; they then underwent a maturation step in a water maturator for 24 hours at ambient temperature then were calcined for two hours in dry air in a traversed bed at 500° C. (temperature ramp-up 5° C./min). The weight content of platinum in the finished catalyst after calcining was 0.48%.

The effluent obtained after hydrodeoxygenating rapeseed oil in the presence of the NiMoP1 catalyst (in accordance with the invention) was hydroisomerized with lost hydrogen (i.e. not recycled) over the catalyst C1 in a hydroisomerization reactor under the following operating conditions:

HSV (volume of feed/volume of catalyst/hour)=1 $h^{-1}$;
total operating pressure: 50 bar;
hydrogen/feed ratio: 700 normal liters/liter.

The temperature was adjusted so that the conversion of the 150° C.$^+$ fraction to the 150° C.$^-$ fraction was less than 5% by weight during hydroisomerization. Before the test, the catalyst underwent a reduction step under the following conditions:

hydrogen flow rate: 1600 normal liters per hour per liter of catalyst;
temperature ramp-up from ambient to 120° C.: 10° C./min;
constant temperature stage for one hour at 120° C.;
temperature ramp-up from 120° C. to 450° C. at 5° C./min;
constant temperature stage for two hours at 450° C.;
pressure: 1 bar.

The hydroisomerized effluent was then characterized. The yields and the fuel properties are recorded in Table 3.

TABLE 3

| Yield (wt %) | Characteristics of product (T = 350° C., P = 50 bar, $H_2$/HC = 700 NL/L) |
|---|---|
| $C_1$-$C_7$ cut yield [wt %] | 3 |
| 150° C. – cut yield [wt %] | 15 |
| 150° C. + yield cut (diesel) [wt %] | 85 |
| Cetane index (ASTMD613) | 75 |
| Cold filter plugging point (° C.) | −15 |

Thus, the process of the invention can produce excellent quality gas oil base which satisfies specifications that are in force.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 09/01081, filed Mar. 10, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hydrodeoxygenation of feeds derived from renewable sources with conversion by decarboxylation/decarbonylation limited to at most 10%, using a bulk or supported catalyst comprising an active phase containing at least one element from group VIB and at least one element from group VIII, said elements being in the sulphide form, and the atomic ratio of the at least one element from group VIII to the at least one element from group VIB being strictly more than 0 and less than 0.095, said process being carried out at a temperature in the range 120° C. to 450° C., at a pressure in the range 1 MPa to 10 MPa, at an hourly space velocity in the range 0.1 $h^{-1}$ to 10 $h^{-1}$, and in the presence of a total quantity of hydrogen mixed with the feed such that the hydrogen/feed ratio is in the range 50 to 3000 $Nm^3$ of hydrogen/$m^3$ of feed.

2. A process according to claim 1, in which the atomic ratio of said at least one element from group VIII to said at least one element from group VIB is in the range 0.01 to 0.08.

3. A process according to claim 2, in which the atomic ratio of said at least one element from group VIII to said at least one element from group VIB is in the range 0.01 to 0.05.

4. A process according to claim 3, in which the atomic ratio of said at least one element from group VIII to said at least one element from group VIB is in the range 0.01 to 0.03.

5. A process according to claim 1, in which the quantity of oxide of the element from group VIB is in the range of 1% to 30% by weight with respect to the total catalyst mass and the quantity of oxide of the element from group VIII is strictly more than 0% and less than 1.5% by weight of oxide with respect to the total catalyst mass.

6. A process according to claim 1, in which the conversion by decarboxylation/decarbonylation of the feed derived from renewable sources is limited to at most 4%.

7. A process according to claim 1, in which said process is carried out in a fixed bed.

8. A process according to claim 1, in which said process is carried out in an ebullated bed.

9. A process according to claim 1, in which the effluent from hydrodeoxygenation undergoes at least one separation step.

10. A process according to claim 9, comprising a step for the separation of water and at least one liquid hydrocarbon base.

11. A process according to claim 10, wherein a step for eliminating nitrogen-containing compounds from said liquid hydrocarbon base is carried out after said step for separating water.

12. A process according to claim 11, in which at least a portion of the liquid hydrocarbon base obtained from the step for eliminating organic nitrogen-containing compounds is hydroisomerized in the presence of a hydroisomerization catalyst.

13. A process according to claim 12, in which said hydroisomerization catalyst comprises a metallic active phase constituted by platinum and a hydroisomerizing function based on ZBM-30.

14. A process according to claim 9, comprising a step for gas/liquid separation.

15. A process according to claim 1, in which said catalyst contains a quantity of phosphorus which is more than 1.5% to less than 8% by weight of oxide $P_2O_5$ with respect to the total catalyst mass.

16. A process according to claim 1, in which said catalyst contains a quantity of silicon which is strictly more than 1% and less than 8% by weight with respect to the total catalyst mass.

17. A process for hydrodeoxygenation of feeds derived from renewable sources with conversion by decarboxylation/decarbonylation limited to at most 10%, using a bulk or supported catalyst comprising an active phase containing at least one element from group VIB and at least one element from group VIII, said elements being in the sulphide form, and the atomic ratio of the at least one element from group VIII to the at least one element from group VIB being strictly more than 0 and less than 0.095, said process being carried out at a temperature in the range 120° C. to 450° C., at a pressure in the range 1 MPa to 10 MPa, at an hourly space velocity in the range 0.1 $h^{-1}$ to 10 $h^{-1}$, and in the presence of a total quantity of hydrogen mixed with the feed such that the hydrogen/feed ratio is in the range 50 to 3000 $Nm^3$ of hydrogen/$m^3$ of feed, in which the element from group VIB is molybdenum, and the element from group VIII is nickel.

18. A process according to claim 17, in which the atomic ratio Ni/Mo is in the range of 0.01 to 0.03.

19. A process according to claim 17, in which said catalyst contains a quantity of phosphorus which is strictly more than 1% and less than 8% by weight of oxide $P_2O_5$ with respect to the total catalyst mass.

20. A process for hydrodeoxygenation of feeds derived from renewable sources with conversion by decarboxylation/decarbonylation limited to at most 10%, using a bulk or supported catalyst comprising an active phase containing at least one element from group VIB and at least one element from group VIII, said elements being in the sulphide form, and the atomic ratio of the at least one element from group VIII to the at least one element from group VIB being strictly more than 0 and less than 0.095, said process being carried out at a temperature in the range 120° C. to 450° C., at a pressure in the range 1 MPa to 10 MPa, at an hourly space velocity in the range 0.1 $h^{-1}$ to 10 $h^{-1}$, and in the presence of a total quantity of hydrogen mixed with the feed such that the hydrogen/feed ratio is in the range 50 to 3000 $Nm^3$ of hydrogen/$m^3$ of feed, in which said catalyst contains a quantity of phosphorus which is strictly more than 1% and less than 8% by weight of oxide $P_2O_5$ with respect to the total catalyst mass.

* * * * *

UNITED STATES PATENT AND TRADEMARK OFFICE
CERTIFICATE OF CORRECTION

PATENT NO. : 8,552,235 B2  Page 1 of 1
APPLICATION NO. : 12/715836
DATED : October 8, 2013
INVENTOR(S) : Antoine Daudin et al.

It is certified that error appears in the above-identified patent and that said Letters Patent is hereby corrected as shown below:

Title Page, item (73) Assignee: reads "Merck Patent GmbH, Darmstadt (DE)" should read
--IFP, Rueil-Malmaison Cedex, France--.

Signed and Sealed this
Fifteenth Day of April, 2014

Michelle K. Lee
*Deputy Director of the United States Patent and Trademark Office*